United States Patent [19]

Quinn

[11] 4,073,774

[45] Feb. 14, 1978

[54] PREPARATION OF DICHLOROETHYLENE POLYMERS

[75] Inventor: Clayton B. Quinn, Mount Vernon, Ind.

[73] Assignee: General Electric Company, Schenectady, N.Y.

[21] Appl. No.: 789,028

[22] Filed: Apr. 20, 1977

[51] Int. Cl.² .............................................. C08G 63/62
[52] U.S. Cl. .......................... 260/47 UA; 260/47 XA
[58] Field of Search ..................... 260/47 UA, 47 XA

[56] References Cited

U.S. PATENT DOCUMENTS

| | | | |
|---|---|---|---|
| 2,568,658 | 9/1951 | Pope ................................. | 260/47 UA |
| 2,587,437 | 2/1952 | Bralley et al. .................. | 260/47 UA |
| 3,248,366 | 4/1966 | Schmitt et al. ................. | 260/47 XA |
| 3,312,662 | 4/1967 | Kurkjy ............................. | 260/47 XA |
| 3,453,237 | 7/1969 | Borden et al. .................. | 260/47 UA |
| 3,629,197 | 12/1971 | Stiehl .............................. | 260/47 UA |
| 3,770,697 | 11/1973 | Holub et al. .................... | 260/47 UA |
| 3,789,052 | 1/1974 | Klebe et al. .................... | 260/47 UA |
| 3,989,672 | 11/1976 | Vestergaard ................... | 260/47 XA |

*Primary Examiner*—Herbert J. Lilling
*Attorney, Agent, or Firm*—Joseph T. Cohen; Jerome C. Squillaro

[57] ABSTRACT

Dichloroethylene polymers can be made by the reaction of tetrachloroethylene with a dialkali-metal salt of bisphenol-A. The latter polymers are useful in the molding and coating arts.

7 Claims, No Drawings

PREPARATION OF DICHLOROETHYLENE POLYMERS

This invention is concerned with a process for making dichloroethylene polymers. More particularly, the invention relates to a process which comprises reacting tetrachloroethylene of the formula

$$CCl_2 = CCl_2 \quad (I)$$

with a dialkali-metal phenate of the formula

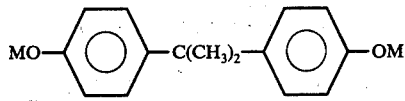

where M is an alkali-metal ion, in an aprotic solvent to form a polymer containing recurring units of the formula

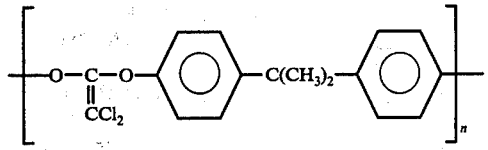

where $n$ is a whole number greater than 1, e.g., from 10 to 10,000 or more.

Among the dialkali-metal phenates which can be employed are, for instance, disodium phenate, dipotassium phenate, etc. Such phenates can be made by effecting reaction between biphenol-A [2,2-bis-(4-hydroxyphenyl)propane] and compounds yielding an alkali-metal ion, e.g., alkali-metal hydroxides such as sodium hydroxide, potassium hydroxide, etc.; potassium carbonate, sodium carbonate, etc.; potassium phosphate, etc. Among the aprotic solvents which may be employed are, for instance, dimethyl sulfoxide, dimethyl formamide, N,N-dimethyl acetamide, N-methyl pyrrolidone, etc. Mixtures of these solvents are included within the scope of the invention.

The molar ratio of the dialkali-metal phenate to the tetrachloroethylene is preferably within the range from 0.9 to 1.1 mols of the dialkali phenate per mol of tetrachloroethylene, and preferably equal molar proportion of the ingredients being used.

Instead of preforming the alkali-metal phenate prior to reaction with the tetrachloroethylene, one can also effect reaction in situ between the bisphenol-A and an alkali-metal hydroxide or other compound generating the alkali-metal ion, such as potassium phosphate, potassium carbonate, sodium phosphate, sodium carbonate, etc. This in situ formation of the alkali-metal phenate (which would use about 2 mols of the alkali-metal compound per mol bisphenol-A) avoids the necessity of preforming the alkali-metal phenate. Thus, one can effect reaction in a reaction vessel between the tetrachloroethylene, bisphenol-A, and the compound generating the alkali-metal ion in a suitable aprotic solvent whereby the alkali-metal phenate is formed in advance for reaction with the tetrachloroethylene. It should be understood that whether the reaction chosen uses the preformed phenate or the phenate is formed in situ, the reaction in both instances is between the dialkali-metal phenate and the tetrachloroethylene.

The aprotic solvent concentration may be varied widely, it only being required that sufficient amount of the solvent be used to form a stirrable solution of the reactants and the reaction product. Generally, one can employ, on a weight basis, from 0.5 to 25 parts or more of the aprotic solvent per part of the weight of the mixture of the dialkalimetal phenate (or bisphenol-A if in situ formation is planned) and the tetrachloroethylene. Temperatures of the order from about 50° C. to the reflux temperature of the mass (or higher, e.g., 125° C. if superpressure is used) are usually sufficient for effecting reaction. The use of an inert atmosphere, such as a nitrogen blanket over the reactants while the reaction is being carried out, is advantageously employed. Thereafter the reaction mixture is cooled and water added in an amount sufficient to precipitate the desired polymer which can then be washed with a suitable solvent, e.g., methyl alcohol, and dried to give the polymer of formula III.

In order that those skilled in the art may better understand how the present invention may be practiced, the following examples are given by way of illustration and not by way of limitation. Stirring and a nitrogen blanket were employed in each reaction.

EXAMPLE 1

To a reaction vessel equipped with nitrogen inlet and stirring means, were added 0.960 gram (0.00353 mol) of the disodium salt of bisphenol-A, 0.586 gram (0.00353 mol) tetrachloroethylene, and 28 ml anhydrous dimethyl formamide. The mixture was heated at the reflux temperature of the mass under a nitrogen atmosphere for about 48 hours. Thereafter the reaction mixture was cooled and water added to cause a white precipitate to form. The precipitate was collected by filtration, washed with water and then methanol, and air dried to yield 0.71 gram of a polymer having recurring units of formula III and a molecular weight of about 3200.

EXAMPLE 2

In this example, 5.44 grams of the disodium salt of bisphenol-A, 1.66 grams tetrachloroethylene, and 30 ml hexamethyl phosphoramide were heated similarly as above under a nitrogen atmosphere at 150° C. for about 24 hours. The reaction mixture was poured into aqueous acetic acid and the aqueous solution extracted three times with diethyl ether. Ether extracts were washed with saturated sodium bicarbonate in water and dried over anhydrous magnesium sulfate. Filtration and evaporation of the diether solvent gave a product which when dissolved in methylene chloride and filtered, and the methylene chloride evaporated gave a polymer composed of recurring units of formula III.

EXAMPLE 3

In this example, the same conditions of reaction were employed as in Example 1 with the exception that instead of using the disodium salt of bisphenol-A, one molar equivalent of bisphenol-A and 2 mols of potassium carbonate were used with tetrachloroethylene so that the dipotassium salt of bisphenol-A was formed in situ. The mixture of ingredients in the same amount of dimethyl formamide as used in Example 1 was heated at the reflux temperature of the mass. After working up the polymer similarly as was done above in Example 1, there was obtained a polymeric composition corresponding to formula III where $n$ was equal to about 10.

The polymeric compositions of the present invention have application in a variety of physical shapes and forms including their use as molding compounds, coatings, etc. Thus the compositions of the present invention can be used in automobile and aviation applications for decorative and protective purposes such as electrical insulation for motor slot liners, transformers, dielectric capacitors, for container and container linings, in laminating structures where films of the present composition or solutions of the claimed polymers are applied to various heat resistant or other types of materials such as asbestos, glass fiber, and the like, and superimposing the sheets one upon the other and subjecting them to elevated temperatures and pressures to effect the formation of a cohesive laminated structure.

In addition, since the polymers of the present invention can be made by slight variation of the molar ratios (whereby slight excess of the dialkali-metal phenate is employed over the molar concentration of tetrachloroethylene to allow the presence of terminal MO-groups), such polymeric compositions may themselves be treated with phosgene to make polycarbonate resins having moieties corresponding to formula III.

It will of course be apparent to those skilled in the art that in addition to the conditions described in the foregoing examples, other conditions may be employed without departing from the scope of the invention. Moreover, other dialkali-metal phenates and other alkali-metal compounds, examples of which have been given above, can be employed in place of those recited in the examples without departing from the scope of the invention. It will also be apparent that other aprotic solvents, many examples of which have been given above, may be used within the scope of the intended invention.

What I claim as new and desire to secure by Letters Patent is:

1. The process for making solid polymers comprising units of the formula

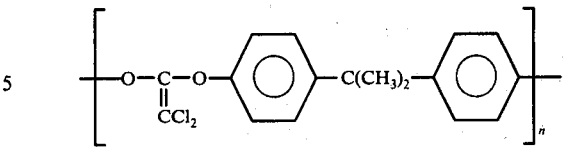

where $n$ is a whole number greater than 1, which comprises effecting reaction between a dialkali-metal salt of bisphenol-A and tetrachloroethylene in an aprotic solvent and thereafter isolating the formed polymers, there being employed a molar ratio of from 0.9 to 1.1 mols of the dialkali-metal salt of bisphenol-A per mol of the tetrachloroethylene.

2. The process as in claim 1 wherein the reaction is carried out by means of an in situ formation of the dialkalimetal salt of bisphenol-A by reacting bisphenol-A and the tetrachloroethylene in the presence of an inorganic alkali-metal compound capable of generating the alkali-metal ion needed to form the alkali-metal salt.

3. The process as in claim 2 wherein the dialkalimetal salt is the disodium salt of bisphenol-A.

4. The process as in claim 2 wherein the dialkalimetal salt is the dipotassium salt of bisphenol-A.

5. The process as in claim 1 wherein the aprotic solvent is dimethyl formamide.

6. The process as in claim 1 wherein the aprotic solvent is hexamethyl phosphoramide.

7. A solid polymeric composition comprising the recurring unit

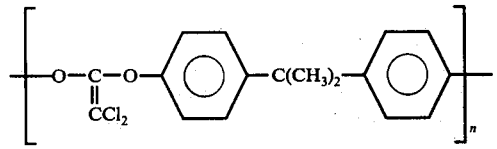

where $n$ is a whole number in excess of 1.

* * * * *